Sept. 20, 1932.   V. R. STENGER   1,878,199
LOCK NUT
Filed Aug. 13, 1928
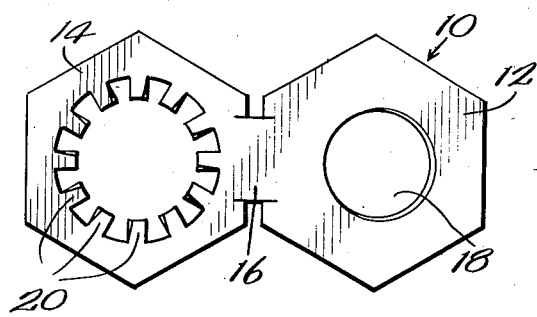
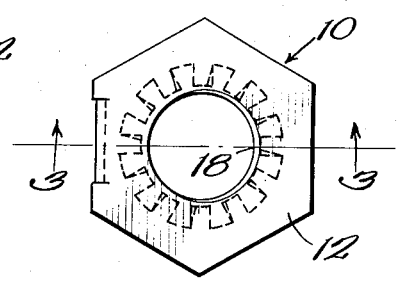
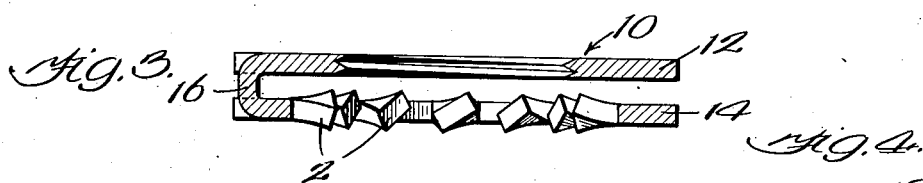
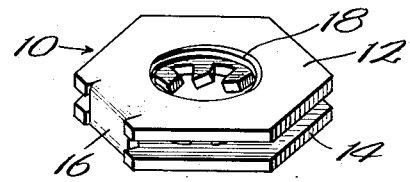
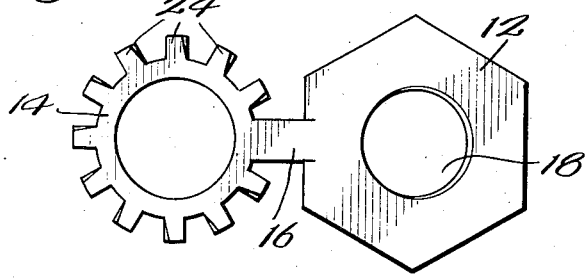
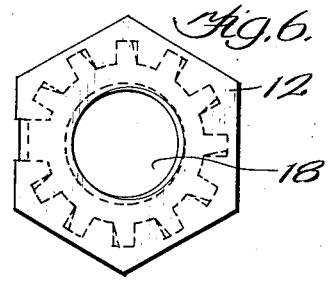
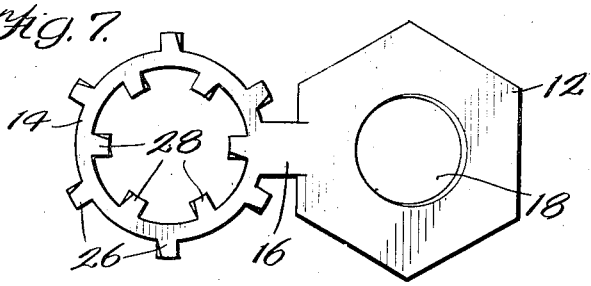
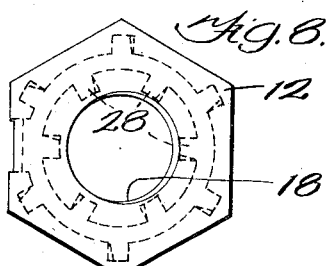
Inventor:
Victor R. Stenger
By Cheever & Cox Attys.

Patented Sept. 20, 1932

1,878,199

UNITED STATES PATENT OFFICE

VICTOR R. STENGER, OF CHICAGO, ILLINOIS, ASSIGNOR TO SHAKEPROOF LOCK WASHER COMPANY, OF CHICAGO, ILLINOIS, A CORPORATION OF DELAWARE

LOCK NUT

Application filed August 13, 1928. Serial No. 299,247.

My invention relates to lock nuts and particularly to lock nuts of the type provided with twisted marginal teeth or prongs for engaging the work.

It has been found through experience, as for example in assembling relatively small parts or parts which are located in inaccessible places, that some difficulty is experienced and considerable time expended in applying lock washers and nuts in place. In other words, in applying such parts to a threaded member such as a bolt which is located in a relatively inaccessible place, the lock washer must first be applied and then the nut must be screwed upon the bolt in order to secure the parts in position. One of the primary objects of my present invention is to reduce to a minimum the time which is required to secure such parts together and to this end I propose to provide a lock nut of simple and inexpensive construction which is not only formed with the usual threaded aperture to permit of its application to a threaded bolt but also is formed with an integral annular portion which is provided with a plurality of marginal twisted locking teeth.

More specifically, my invention contemplates the provision of a lock nut which may be formed or stamped from sheet metal, one section thereof presenting a body portion in which a threaded aperture is provided and another section formed integral therewith which likewise presents a body portion having a plurality of marginal twisted teeth, thereby providing a unitary lock washer and nut which may be applied in one operation to a threaded bolt or the like.

A still further object of my present invention is to provide a lock nut of the instant nature which is not only of economical and simple construction but which lends itself particularly adaptable for use with relatively small parts as for example small screws and the like; and I propose to accomplish this object by forming a pair of connected annular members from flat stock, one of said members having a threaded aperture and the other formed with twisted locking teeth.

These and other objects will be more apparent from the following detailed description when considered in connection with the accompanying drawing herein.

Figure 1 is a plan view of a lock nut representing one embodiment of my invention, the same being shown before the two annular sections thereof have been folded together;

Figure 2 is a plan view of the lock nut shown in Figure 1 after the two sections comprising the same have been folded together;

Figure 3 is a transverse sectional view of the lock nut taken along the line 3—3 of Figure 2;

Figure 4 is a perspective view of the lock nut shown in Figures 2 and 3;

Figure 5 is a modified or alternative form of the invention disclosing a lock nut before being folded, the same being provided with external marginal twisted teeth;

Figure 6 discloses the lock nut of Figure 5 after the same has been folded together;

Figure 7 is also a modified form of the invention disclosing a lock nut similar to Figures 1 and 5, said nut being provided with internal and external marginal teeth; and Figure 8 discloses the lock nut of Figure 7 after the sections thereof have been folded together.

Referring now to the drawing in detail wherein like numerals have been employed to designate similar parts throughout the various figures, it will be observed that one embodiment of my invention comprises a lock nut indicated generally by the numeral 10 (Figures 1 and 2) which is comprised of a pair of annular members 12 and 14, said annular members being preferably formed or stamped from suitable flat stock (Figure 1). These annular members or sections 12 and 14 are connected by an integral section 16. The section 12 is preferably polyhedral in shape and is provided centrally thereof with a threaded aperture 18. The other section 14 is provided with a plurality of marginal internal teeth or prongs 20, which are twisted out of the plane of the flat stock and when these sections 12 and 14 are folded along the interconnecting section 16 so as to present the structure shown in Figure 2, the threaded aperture 18 will register with the aperture bounded by the inner ends of the teeth 20.

From the foregoing, it will be seen that by folding the two sections along the line of interconnection a unitary or combination lock nut and lock washer is presented. In applying this lock nut 10 to the work, the section 14 is obviously moved in advance of the section 12 and by reason of the polyhedral or hexagonal outline of the section 12, a conventional wrench may be employed to cause the twisted teeth to be carried into locking engagement with the work. By having said teeth twisted out of the plane of the section 14, the sharp outwardly projecting corners 22 will be caused to dig into the work and any attempt to unscrew the lock nut will be effectively counter-acted.

It will be obvious that various forms of locking teeth may be formed on the section 14 without departing from the spirit and scope of my invention and it will be seen in Figures 5 to 8 inclusive that I have disclosed certain modifications.

In Figures 5 and 6, I have disclosed the section 14 as being provided with a plurality of external marginal teeth 24 and in Figures 7 and 8, said section is provided with a plurality of external teeth 26 and also internal teeth 28.

My invention is particularly adaptable for use in connection with relatively small parts. In the drawing, the lock nuts have been drawn to a scale which is large enough to clearly disclose the functional characteristics thereof but it is to be understood that these lock nuts may be made very small so as to adapt them for use on relatively small screws. By reason of the fact that these nuts may be stamped or formed from relatively thin flat stock, teeth may be formed and twisted in one of the sections which will be very effective even though the entire lock nut as a unit, is comparatively small. I am thus able to avoid the inconvenience which is necessarily incident to the application of very small lock washers on screws. This will be apparent from the fact that my device presents the lock washer and the nut as a unit and thus as the threaded section, namely, the section 12, is being applied to a screw, the lock washer portion thereof, namely the section 14, will be automatically guided into operative association with the work. As I have hereinbefore suggested, my lock nut greatly facilitates the application of locking devices upon threaded members such as bolts which are difficult to reach, and this particular advantage resides in the unitary arrangement of my device.

It will also be apparent that instead of making two separate pieces, namely a nut and a lock washer, my invention contemplates the forming of said parts from a single piece of flat stock, thereby greatly reducing the cost of manufacture. Lock nuts of my improved design may be very effectively employed on small machine screws where a thin section of steel or hard material will have sufficient strength or holding power. Attention is also directed to the fact that as the marginal teeth of a lock nut of my improved design are tightened against the work, the two sections 12 and 14 will be sprung toward each other. It will thus be clear that the inherent resiliency of the portion 16 which interconnects the sections 12 and 14 will serve to bind the nut in position upon a threaded member. In other words, by springing the two sections 12 and 14 together, as the nut is tightened against the work a force is introduced which acts in addition to the locking effect of the marginal teeth to secure the lock nut against unscrewing. In the drawing I have disclosed a lock nut which is comprised of two connected sections arranged in substantial parallelism, and it will be apparent that said nut may be comprised of more than two parallel sections without departing from the spirit and scope of my invention.

Having thus described my invention, what I claim as new and desire to protect by Letters Patent is:

1. A lock nut comprising a pair of connected sections, said sections being folded toward each other at the point of connection, one of said sections being provided with a plurality of warped teeth for lockingly engaging the work, and one of said sections being threaded for application to a threaded member.

2. A lock nut having a portion of its axial extent threaded for screwing onto a bolt, and another portion provided with internal warped teeth for engaging the work.

3. A lock nut comprising a section of flat stock having a threaded aperture formed therein, and a plurality of annularly disposed internally extending warped prongs for engaging the work.

4. A lock nut comprising a pair of connected sections, said sections being folded toward each other at the point of connection, one of said sections being provided with a plurality of marginal warped teeth for lockingly engaging the work and the other of said sections having a threaded opening for application to a threaded member.

In witness whereof, I have hereunto subscribed my name.

VICTOR R. STENGER.